US006942228B2

(12) United States Patent
Bunce et al.

(10) Patent No.: US 6,942,228 B2
(45) Date of Patent: Sep. 13, 2005

(54) COLLAPSIBLE, PORTABLE UTILITY CART

(76) Inventors: Ricky Bunce, 602 River Shore Ct., Edgewood, MD (US) 21040; John Jacobson, 620 Lacewood Dr., Edgewood, MD (US) 21040

( * ) Notice: Subject to any disclaimer, the term of this patent is extended or adjusted under 35 U.S.C. 154(b) by 174 days.

(21) Appl. No.: 10/241,280

(22) Filed: Sep. 10, 2002

(65) Prior Publication Data
US 2005/0051999 A1 Mar. 10, 2005

(51) Int. Cl.⁷ ............................................. B62B 1/00
(52) U.S. Cl. ..................... 280/30; 280/1.5; 280/47.25; 280/652
(58) Field of Search .................... 280/30, 651, 652, 280/655, 656, 38, 47.131, 47.2, 47.24, 47.25, 280/79.11, 79.3, 1.5; 182/20

(56) References Cited

U.S. PATENT DOCUMENTS

| 2,990,190 | A | * | 6/1961 | Eriksen | 280/30 |
| 3,104,889 | A | * | 9/1963 | Branch, Jr. | 280/30 |
| 3,137,511 | A | * | 6/1964 | Weil et al. | 280/5.24 |
| 4,009,762 | A | * | 3/1977 | Bjerkgard | 182/20 |
| 4,045,040 | A | * | 8/1977 | Fails | 280/1.5 |
| 4,323,260 | A | * | 4/1982 | Suchy | 280/47.25 |
| 4,456,094 | A | * | 6/1984 | Brander | 182/20 |
| 4,846,486 | A | * | 7/1989 | Hobson | 280/47.25 |
| 5,160,153 | A | * | 11/1992 | Zan | 280/43.1 |
| 5,213,360 | A | * | 5/1993 | Lin | 280/648 |
| 5,295,556 | A | | 3/1994 | Mullin | 182/187 |
| 5,433,291 | A | | 7/1995 | Shoestock | 182/20 |
| 5,492,196 | A | | 2/1996 | Michno | 182/20 |
| 5,564,720 | A | | 10/1996 | Stringer | 280/30 |
| 5,636,852 | A | * | 6/1997 | Sistrunk et al. | 280/30 |
| 5,673,928 | A | | 10/1997 | Jury | 280/645 |
| 5,769,431 | A | | 6/1998 | Cordova | 280/1.5 |
| 5,853,189 | A | | 12/1998 | Swartzlander | 280/652 |
| 5,873,582 | A | | 2/1999 | Kaufman et al. | 280/7.12 |
| 6,082,757 | A | * | 7/2000 | Lin | 280/654 |
| 6,142,491 | A | | 11/2000 | Darling | 280/30 |
| 6,164,671 | A | | 12/2000 | Darling | 280/30 |
| 6,186,271 | B1 | | 2/2001 | Borries et al. | 182/20 |
| 6,260,864 | B1 | | 7/2001 | Smith | 280/47.26 |
| 6,270,092 | B2 | | 8/2001 | Darling | 280/30 |
| 6,581,945 | B1 | * | 6/2003 | Shapiro | 280/30 |

\* cited by examiner

*Primary Examiner*—Frank Vanaman
(74) *Attorney, Agent, or Firm*—Larry J. Guffey

(57) ABSTRACT

An improved utility cart is presented which can be configured in various ways so as to allow it to be: used for hauling game or fishing supplies, used as a seat-backed chair, or conveniently backpacked over rough terrain. A preferred embodiment includes: (a) an opening-upward frame structure, (b) a pair of wheels rotatably attached beneath the frame, (c) a handle having an end that is pivotably connected at a point on the front portion of the frame, (d) a seat having an edge that is pivotably attached at a point of the top side of the frame, and (e) a seat brace with an end that is pivotably connected at a second point on the top side of the frame, wherein the seat and seat brace are positionable such that the front portion of the seat is extended to a position which is approximately perpendicular to the top side of the frame and an end of the seat brace is extended from the frame so as to detachably connect with a point on the bottom surface of the seat so as to detachably lock the seat into its extended, second position for serving as a seat when the cart's frame is leaned upwards and supported on its rear portion.

13 Claims, 5 Drawing Sheets

COLLAPSIBLE, PORTABLE UTILITY CART

BACKGROUND OF THE INVENTION

1. Field of the Invention

This invention relates to land vehicles of the type known as carts. More particularly, this invention relates to a collapsible, portable utility cart.

2. Description of Prior Art

Individuals, such as game hunters, often must transport heavy and awkward objects through uneven terrain and/or over considerable distances. For example, a hunter may need to transport large game, such as a deer weighing from one hundred and fifty to over three hundred pounds, that has been taken during the hunt from the spot where it was taken, such as deep in the woods or fields of the area being hunter, to the hunter's car are truck which is located on the perimeter of the hunted area. This transport task can often be a very physically demanding or even impossible without the aid of some sort of land vehicle or cart.

Additionally, many types of game hunting often require that the hunter wait quietly for extended periods of time in one spot while waiting for the game to cross the hunter's field of view. During these extended waiting periods, many hunters would rather sit than stand. Unfortunately, there is often nothing nearby a desired waiting spot on which for the hunter to sit other than the ground.

Various types of carts have been in use for many years. Typically, conventional carts include a pair of wheels rotatably attached to a frame structure having a plurality of side walls along with a handle for pulling the cart. Unfortunately, these carts usually are not designed for utilization within uneven terrain, such as in a field or the woods where a hunter might require the use of a cart to transport game. Also, because these carts have only a pair of wheels, they usually do not have any sort of surface that can be positioned horizontally so that it temporarily might be used as a seat. Examples of such carts include U.S. Pat. No. 5,673,928 to Jury, 5,769,431 to Cordova and 5,853,189 to Swartzlander.

More recently, various types of hunting carts have been introduced to serve the needs of hunters who must traverse uneven and difficult terrain. In general, these carts still tend to have a single pair of wheels rotatably attached to a frame structure having a plurality of side walls along with a handle for pulling the cart. To better navigate uneven terrain, some have introduced V-shaped frames with converging wheels, see U.S. Pat. No. 6,260,864 to Smith; while others have proposed using sled-wheel combinations, see U.S. Pat. No. 5,873,582 to Kauffman and Leatherman.

Additionally, hunting carts have been introduced that are easily disassembled so that their parts might be rearranged to make them easily transportable, for example, in a backpack or on a hunter's back. See U.S. Pat. No. 5,563,720 to Stringer and 6,142,491, 6,164,671 and 6,270,092 to Darling.

Other inventions in this area have concentrated on introducing multi-purpose, cart-like devices that can be used as either hunting carts or parts of a tree stand. See U.S. Pat. No. 5,295,556 to Mullin, 5,433,291 to Shoestock, 5,492,196 to Michno and 6,186,271 to Borries and Scarborough.

Thus, despite prior art for a relatively wide assortment of utility carts, there still exists a continuing need for the development of new and improved carts that can more fully satisfy the needs of hunters and other outdoorsmen/women.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide an improved utility cart that is easier for one to use and transport over uneven or other difficult terrain.

It is another object of the present invention to provide an improved hunting cart that can be configured so that it can be used as a chair by a hunter.

It is yet another object of the present invention to provide an improved utility cart that is collapsible so as to make it easier to carry and transport.

These and other objects and advantages of the present invention will become readily apparent as the invention is better understood by reference to the accompanying summary, drawings and the detailed description that follows.

SUMMARY OF THE INVENTION

Recognizing the need for the development of an improved utility cart, the present invention is generally directed to satisfying the needs set forth above and overcoming the disadvantages identified with prior carts.

In accordance with the present invention, the foregoing need can be satisfied by providing a collapsible utility cart comprising: (a) an opening-upward frame structure, (b) a pair of wheels rotatably attached beneath the frame, (c) a handle having an end that is pivotably connected at a point on the front portion of the frame, (d) a seat having an edge that is pivotally attached at a point of the top side of the frame, and (e) a seat brace having an end that is pivotably connected at a second point on the top side of the frame, wherein the seat and seat brace are positionable such that the front portion of the seat is extended to a position which is approximately perpendicular to the top side of the frame and detachably locked in this position by the seat brace so that when the cart's frame is leaned upwards the seat becomes nearly horizontal to the ground and thus can serve as a chair.

Another preferred embodiment of the present invention comprises the embodiment previously described plus the further components including: (f) a downward-extending, front axle bracing member having ends that are pivotably attached at a first point on either side of the frame, (g) a downward-extending, rear axle bracing member having ends that are pivotably attached at a second point on either side of the frame, and (h) with the pair of wheels being rotatably connected to an axle that is attached proximate the midportion of the rear axle bracing member; wherein the axle bracing members positionable so that the members are extended below the frame such that their mid portions are proximate each other and detachably locked together so as to fix the axle at a distal position beneath the frame, thereby providing the frame with greater ground clearance.

Thus, there has been summarized above, rather broadly, the present invention in order that the detailed description that follows may be better understood and appreciated. There are, of course, additional features of the invention that will be described hereinafter and which will form the subject matter of any eventual claims to this invention.

DETAILED DESCRIPTION OF THE PREFERRED EMBODIMENT

Figure 1:
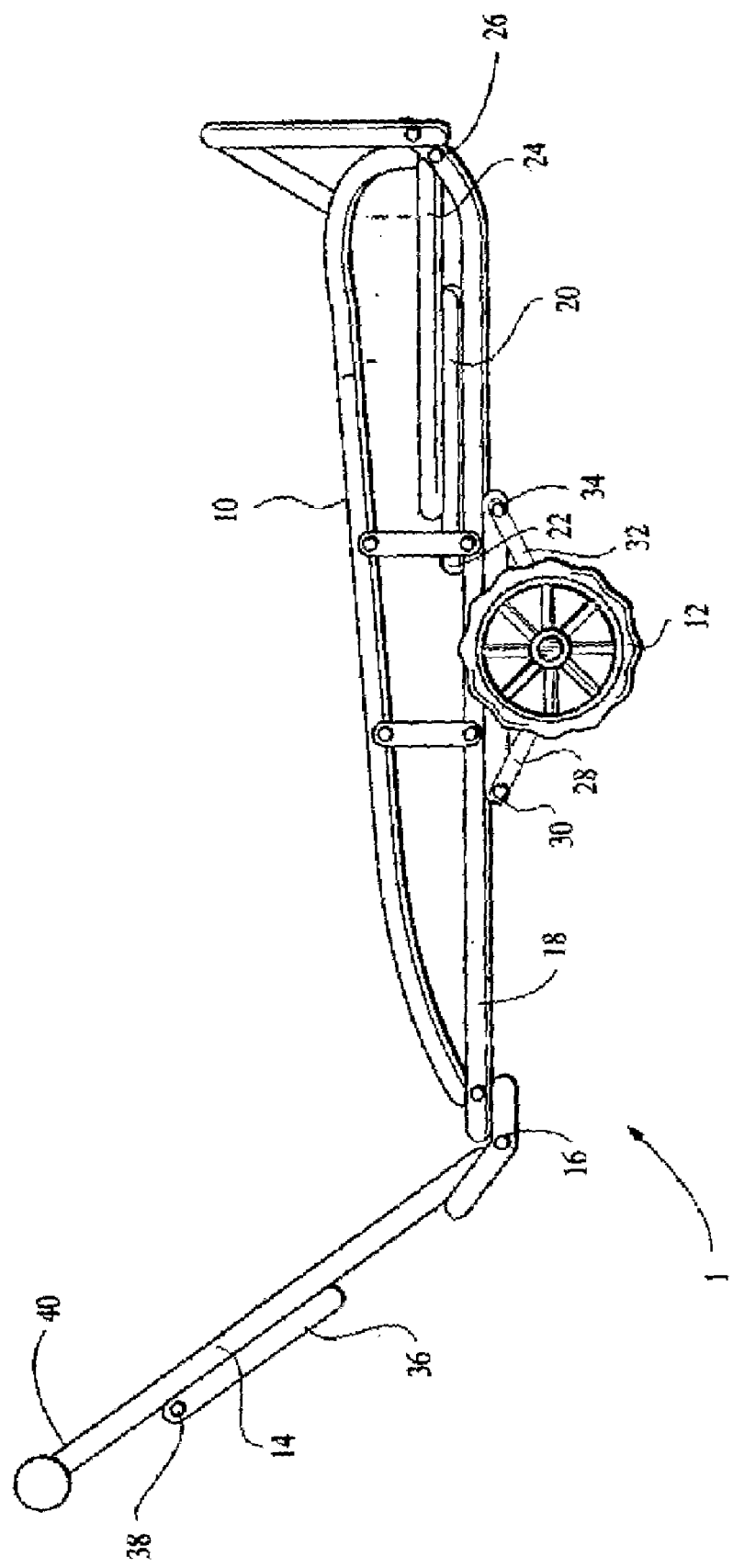
FIG. 1 is a side view of a preferred embodiment of the present invention when its handle and wheels are extended so that the cart may be rolled along the ground.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 2:
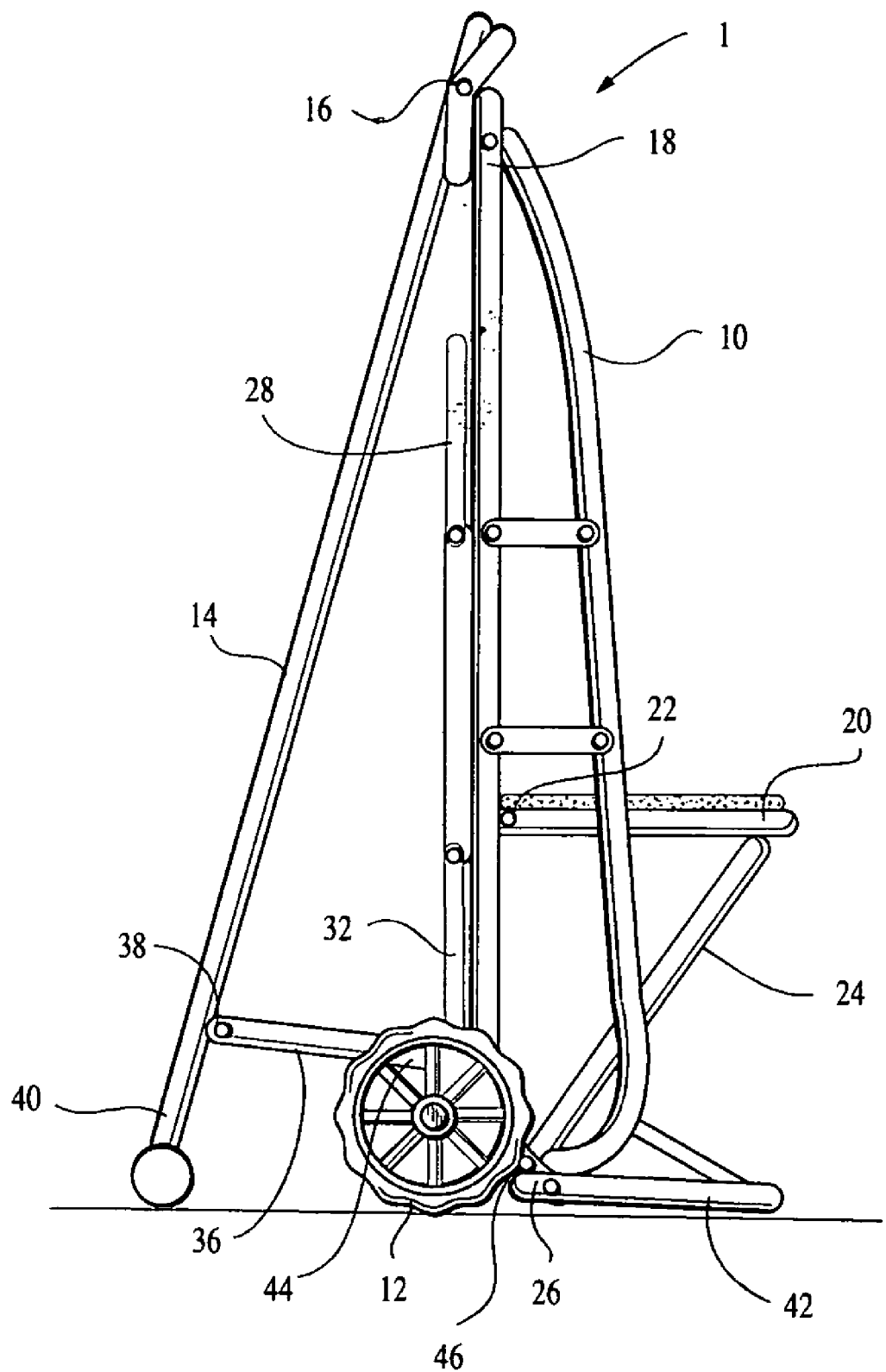
FIG. 2 is a side view of the cart shown in FIG. 1 where its handle has been positioned so as to form a leg to support the frame which has been stood on its rear end, with its wheels retracted and its seat extended so as to form a chair.
Figure 3:
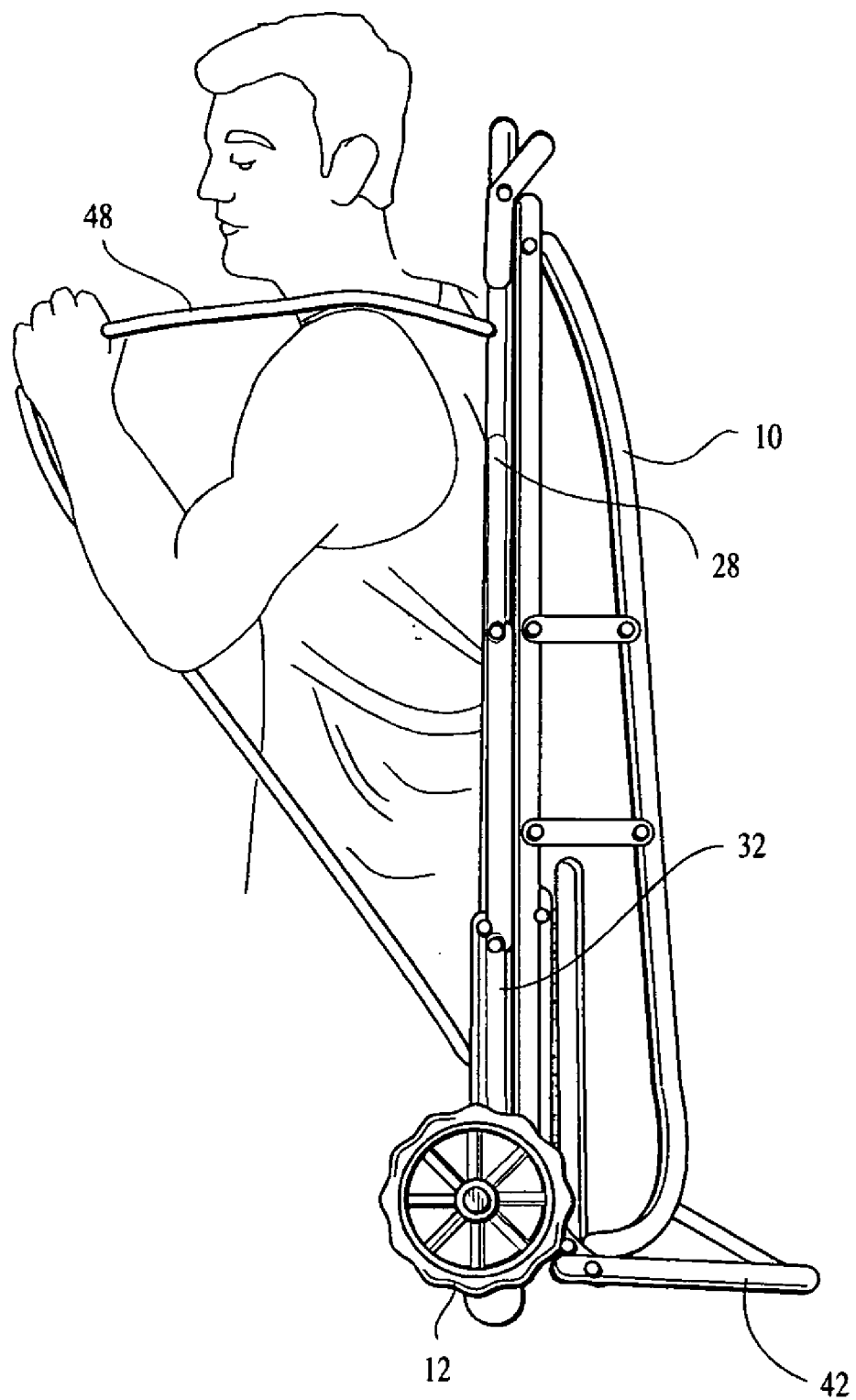
FIG. 3 is a side view of the cart shown in FIG. 1 where its handle, wheels and seat have been retracted and shoulder straps provided on the bottom of the frame so that the collapsed cart may be transported like a backpack.

A preferred embodiment of the present invention is shown in FIGS. 1–3, with each of these figures showing the invention configured in one of the forms in which it is designed for use. FIG. 1 shows a side view of an improved utility cart 1 when it is configured for hauling game or other heavy objects.

This embodiment is seen to consist of: (a) an opening-upward frame structure 10, (b) a pair of wheels 12 rotatably attached beneath the frame 10, (c) a handle 14 having an end 16 that is pivotably connected at a point on the front portion 18 of the frame 10, (d) a seat 20 having an edge 22 that is pivotably attached at a point of the top side of the frame 10, (e) a seat brace 24 with an end 26 that is pivotably connected at a second point on the top side of the frame 10, (f) a downward-extending, front axle bracing member 28 having ends 30 that are pivotably attached at a first point on either side of the frame 10, (g) a downward-extending, rear axle bracing member 32 having ends 34 that are pivotably attached at a second point on either side of the frame 10, wherein the pair of wheels 12 are attached to the rear axle bracing member 32, and (h) a support member 36 having an end 38 that is pivotably attached proximate the second or distal end 40 of the handle 14.

As shown in FIG. 1 when the cart is configured for hauling game, the cart's axle braces 28, 32 are extended so as to place the frame 10 of the cart 1 at a height where it has greater ground clearance. The distal end 40 of the cart handle is pivoted away from the frame 10 so as to provide a viable handle to be used to grasp and pull the cart 1.

FIG. 2 shows this same cart 1 configured for being used as a chair. The cart's axle braces 28, 32 are retracted so that the wheels 12 are proximate the frame 10. The seat 20 and seat brace 24 are seen to be in their extended positions away from the frame 10 so as to provide a horizontally located seat. The frame 10 is seen to be tilted upward on its rear portion 42 which has been configured so that it can rest on the ground to provide a base of support for the frame 10 when it is tilted in this manner. The distal end of the handle 40 of the cart 1 has been pivoted downward so that it can rest on the ground when the frame 10 is tilted upward. The handle 14 is locked in this position by using the second or distal end 44 of the handle's support member 36 to detachably lock with a point 46 on the bottom of the frame near its rear portion 42 so that this support member 36 can serve as brace for the handle 14.

FIG. 3 shows this same cart when it has been configured so that it can more conveniently be transported by back-packing it. The cart's axle braces 28, 32 are retracted so that the wheels 12 are proximate the frame 10. The seat 20 and seat brace 24 are retracted so that they also lie proximate the frame 10. The distal end of the handle 40 of the cart 1 has been pivoted downward so that it is proximate the frame and its support member 36 is retracted so that it lies proximate the handle 14. Two shoulder harnesses 48 are attached to the bottom side of the frame 10 and allow it to be conveniently backpacked.

Figure 4:
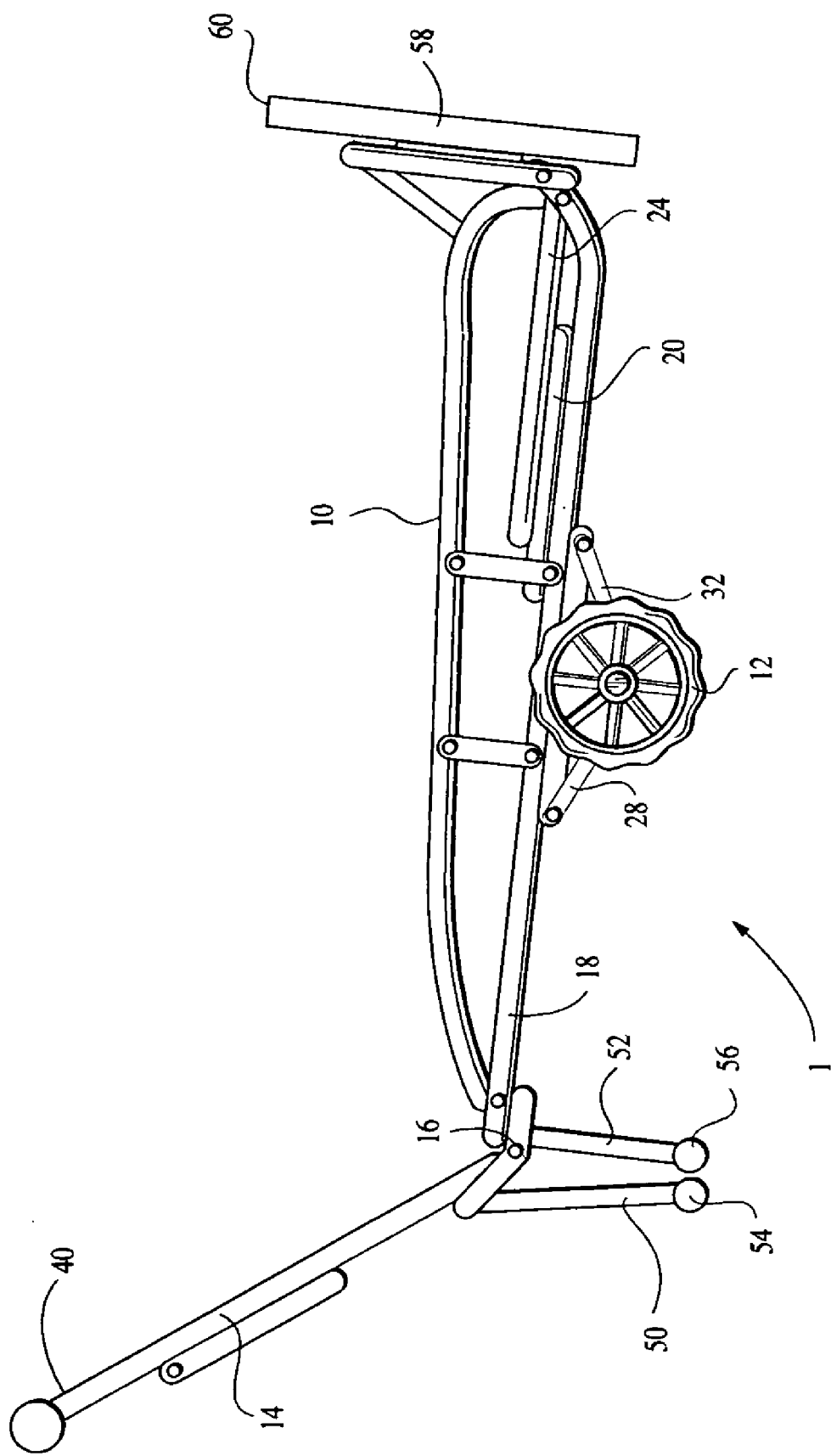
FIG. 4 is a side view of the cart shown in FIG. 1 after it has been modified so that it can better serve to carry fishing supplies.

Additionally, the present invention can be modified so as to conveniently serve as a cart for hauling fishing supplies, such as fishing rods and reels, tackle boxes and coolers. This is accomplished as shown in FIG. 4. by pivotably attaching support members 50, 52 to the underside of the frame 10 and proximate the attachment point of the handle 14. When these members 50, 52 are swung downward and these distal end 54, 56 placed on the ground, it allows the bottom of the frame to sit 18 approximately horizontal to the ground and be loaded with coolers, fishing tackle boxes, etc. The attachment of tubes 58 to the rear portion 42 of the frame 10 allows these tubes 58 to serve as holders for fishing rods who handles are placed in the tubes 58 so that the rods extend down into the tubes 58 until their attached reels abut the open, top edges 60 of the tubes 58.

Figure 5:
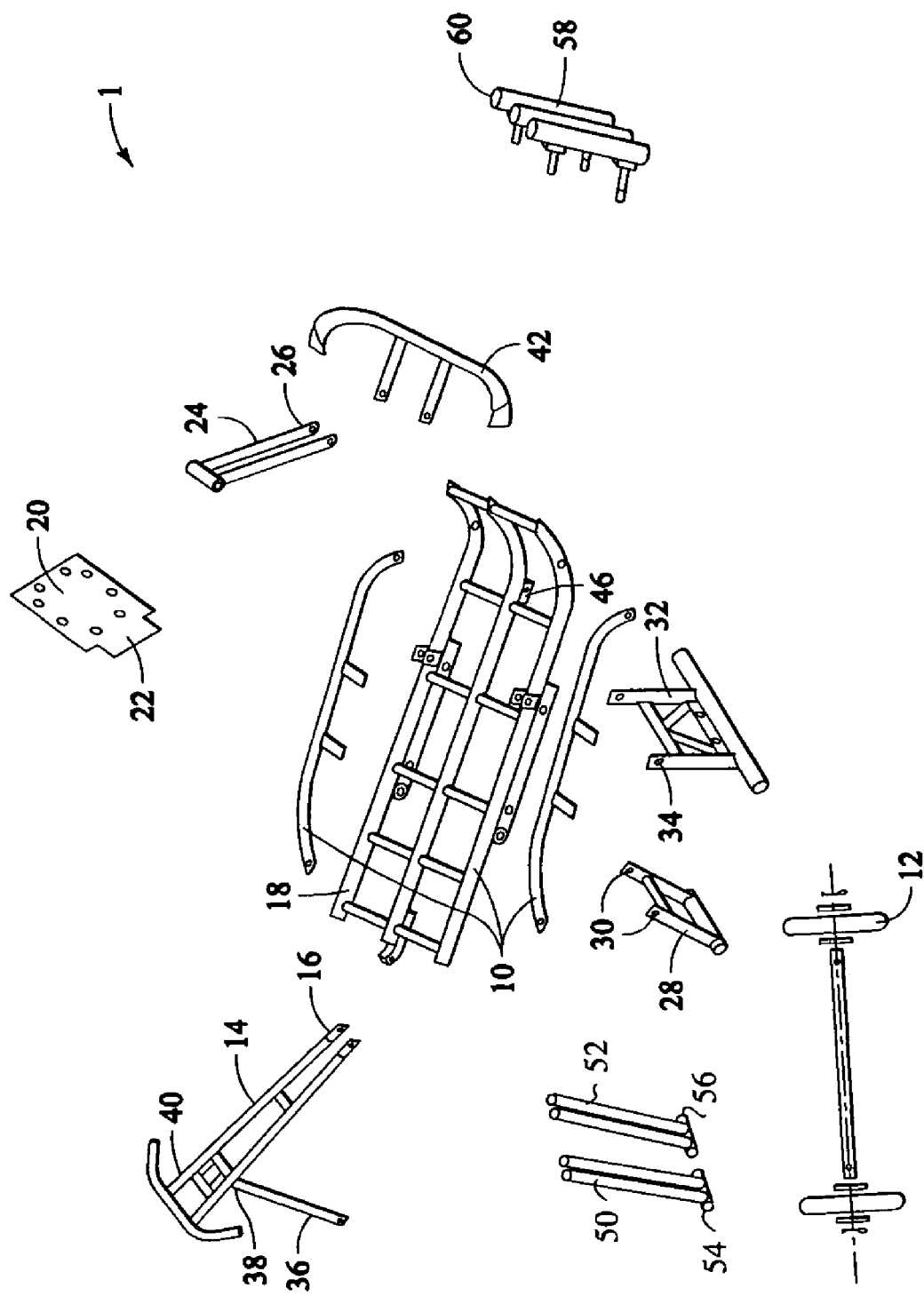
FIG. 5 is an exploded view of the carts shown in FIGS. 1–4 showing their various components.

FIG. 5 provides an exploded view of various components which comprise the embodiment of the cart shown in FIGS. 1–4. Lightweight materials have been found to be the most viable for use in constructing the hunting cart of the present invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as hereinafter set forth in the claims.

We claim:

1. A collapsible cart comprising:
    an opening-upward frame structure, said frame structure having a front and a rear portion,
    a pair of wheels rotatably attached beneath said frame,
    a handle having a first and a second end, said first end being pivotably connected at a point on the front portion of said frame,
    a seat having a front and a rear portion, said rear portion having an edge that is pivotably attached at a first point of the top side of said frame, a seat brace having a proximate and a distal end, said proximate end being pivotably connected to a second point on the top side of said frame, wherein said seat and seat brace by pivotably positionable between two positions, a first position in which said seat and seat brace are in close proximity to said frame, and a second position in which said front portion of said seat is extended to a position which is approximately perpendicular to the top side of said frame and said distal end of said seat brace is extended from said frame top surface so as to detachably connect with a point on the bottom surface of said seat front portion so as to lock said seat into its extended, second position for serving as a seat, and said frame rear portion being configured so a portion extends upward from the remainder of said frame so as to provide a support surface which can be placed on the ground when said front frame portion is raised so that it can be leaned upward to serve as a seat back for said seat when said cart is configured to be used as a chair.

2. The collapsible cart of claim 1, further comprising:

a downward-extending, front axle bracing member having two ends, each said end being pivotably attached at a first point on either side of said flame structure, a downward-tending, rear axle bracing member having two ends, each said end being pivotably attached at a second point on either side of said frame structure, wherein said pair of wheels are rotatably connected to an axle that is attached to one of said axle bracing members, wherein said axle bracing members being pivotably positionable in one of two positions, a first position in which said axle bracing members are in close proximity to said frame and a second position in which said axle bracing members are extended below said frame such that their mid portions are proximate each other and detachably locked together so as to fix said axle at a distal position beneath said frame, said second axle position providing said frame with greater ground clearance when wheels are in use and said first axle position allowing said wheels to be collapsed closer to said frame when said wheels are not being used.

3. The collapsible cart of claim 2, further comprising:

a support member having a first and a second end, said first end being pivotably attached proximate the second end of said handle, said support member being positionable between a first position in which said support member is proximate said handle and a second position in which the second end of said support member has been extended from said handle and detachably connected to a point on the bottom of the frame proximate its rear portion, wherein the second end of said handle having been pivoted downward so that it can rest on the ground when said frame is tilted upward so that said frame can act as a seat back for said seat.

4. The collapsible cart of claim 2, further comprising:

a pair of shoulder harnesses having ends that are detachably connected to the bottom side of said frame so as to allow said cart to be backpacked.

5. The collapsible cart of claim 3, further comprising:

a pair of shoulder harnesses having ends that arm detachably connected to the bottom side of said frame so as to allow said cart to be backpacked.

6. The collapsible cart of claim 3, further comprising:

a plurality of tubes attached to the rear portion of said frame and configured so that they can have inserted into them the handles of fishing rods, and a support member having a proximate and a distal end, said proximate end being pivotably attached to the bottom of said frame proximate the attachment point of said handle, wherein when support member is pivoted downward its distal end can rest on the ground so as to allow said frame to sit approximately parallel to the ground.

7. The collapsible cat of claim 1, further comprising:

a support member having a first and a second end, said first end being pivotably attached proximate the second end of said handle, said support member being positionable between a first position in which said support member is proximate said handle and a second position in which the second end of said support member has been extended from said handle and detachably connected to a point on the bottom of the frame proximate its rear portion, wherein the second end of said handle having been pivoted downward so that it can rest on the ground when said frame is tilted upward so that said frame can act as a seat back for said seat.

8. The collapsible cart of claim 7, further comprising:

a pair of shoulder harnesses having ends that are detachably connected to the bottom side of said frame so as to allow said cart to be backpacked.

9. The collapsible cart of claim 1, further comprising:

a pair of shoulder harnesses having ends that are detachably connected to the bottom side of said frame so as to allow said cart to be backpacked.

10. The collapsible cart of claim 1, further comprising:

a plurality of tubes attached to the rear portion of said frame and configured so that they can have inserted into them the handles of fishing rods, and a support member having a proximate and a distal end, said proximate end being pivotably attached to the bottom of said frame proximate the attachment point of said handle, wherein when support member is pivoted downward its distal end can rest on the ground so as to allow said frame to sit approximately parallel to the ground.

11. An improved cart having an opening-upward frame structure, a pair of wheels and a handle, wherein the improvement comprises:

a downward-extending, front axle bracing member having two ends, each said end being pivotably attached at a first point on either side of said frame structure, a downward-extending, rear axle bracing member having two ends, each said end being pivotably attached at a second point on either side of said flame structure, wherein said pair of wheels are rotatably connected to an axle that is attached to one of said axle bracing members, wherein said axle bracing members being positionable in one of two positions, a first position in which said axle bracing members are in close proximity to said frame and a second position in which said axle bracing members are extended below said frame such that their mid portions are proximate each other and detachably locked together so as to fix said axle at a distal position beneath said frame, a seat having a front and a rear portion, with said rear portion having an edge that is pivotably attached at a first point of the top side of said frame, a seat brace having a proximate and a distal end, said proximate end being pivotably connected to a second point on the top side of said frame, wherein said seat and seat brace being positionable between two positions, a first position in which said seat and seat brace are in close proximity to the top side of said frame, and a second position in which said front portion of said seat is extended to a position which is approximately perpendicular to the top side of said frame and said distal end of said seat brace is extended from said frame top surface so as to detachably connect with a point on the bottom surface of said seat front portion so as to lock said seat into its position for serving as a seat, said frame having a front and a rear portion, said handle having a first and a second end, said handle first end being pivotably attached at a point on said front frame portion, and said frame rear portion being configured so a portion extends upward from the remainder of said frame so as to provide a support surface which can be placed on the ground when staid front frame portion is raised so that it can be leaned upward to serve as a seat back for said seat when said cart is configured to be used as a chair.

12. The improved cart of claim 11, further comprising:

a support member having a first and a second end, said first end being pivotably attached proximate the second end of said handle, said support member being positionable between a first position in which said support member is proximate said handle and a second position in which the second end of said support member has been extended from said handle and detachably connected to a point on the bottom of the frame proximate its rear portion, wherein the second end of said handle having been pivoted downward so that it can rest on the ground when said frame is tilted upward so that said frame can act as a seat back for said seat.

13. The improved tart of claim 12, further comprising:

a pair of shoulder harnesses having ends that are detachably connected to the bottom side of said frame so as to allow said cast to bc backpacked.

* * * * *